No. 835,686. PATENTED NOV. 13, 1906.
J. P. KOLLA.
FIRE POT FOR FURNACES AND STOVES.
APPLICATION FILED MAR. 23, 1906.
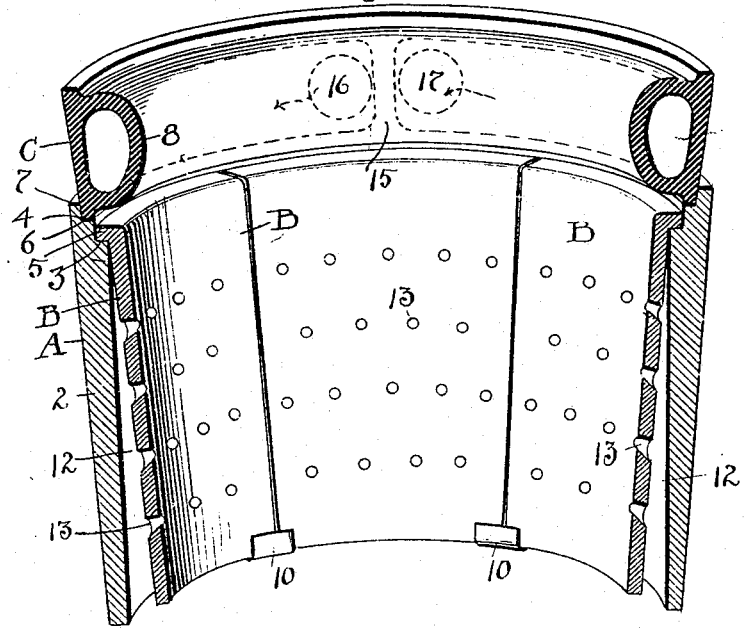
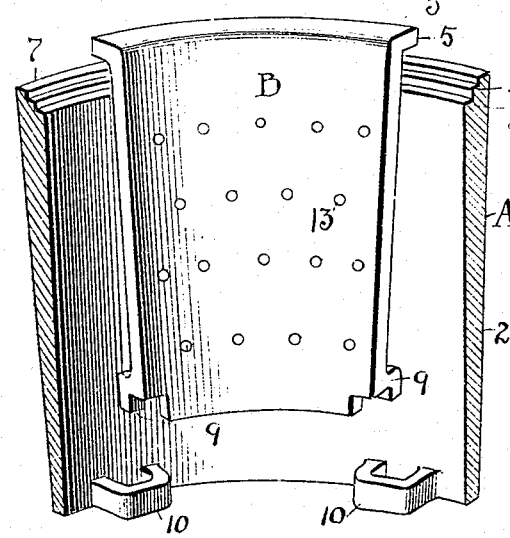
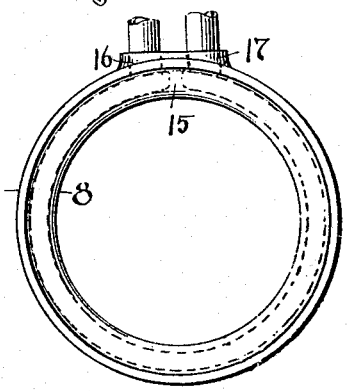
ATTEST
R. B. Moert
C. A. Sell
INVENTOR
John P. Kolla
By H. J. Fisher ATTY ized upon its outside by a confining-rib 7
UNITED STATES PATENT OFFICE.

JOHN P. KOLLA, OF AKRON, OHIO.

FIRE-POT FOR FURNACES AND STOVES.

No. 835,686.         Specification of Letters Patent.         Patented Nov. 13, 1906.

Application filed March 23, 1906. Serial No. 307,602.

*To all whom it may concern:*

Be it known that I, JOHN P. KOLLA, a citizen of the United States, residing at Akron, in the county of Cuyahoga and State of Ohio, have invented certain new and useful Improvements in Fire-Pots for Furnaces and Stoves; and I do declare that the following is a full, clear, and exact description of the invention, which will enable others skilled in the art to which it appertains to make and use the same.

My invention relates to fire-pots for furnaces, and is an improvement in that class of fire-pots constructed to provide a free circulation of air through the walls of the pot, all substantially as shown and described, and particularly pointed out in the claims.

My first object is to construct a durable fire-pot adapted to withstand intense heat and which is built with inner removable sections, so that any one or all of them may be replaced after long usage or if broken or burned out.

I also provide for a free circulation of air within the walls of the pot to preserve the life of the pot and its parts.

A further important feature is embodied in the fire-pot, which provides for a free and complete distribution of heated air to the fuel within the pot from all sides and the full depth thereof, thereby promoting combustion from the top downward and from the circumference to the center of the pot.

I also guard against the closing of the air-openings by the ashes or cinders.

I further provide the pot with a water-heating section or coil which forms a continuation of the pot and affords additional radiating-surface.

In the accompanying drawings, Figure 1 is a sectional view in perspective of the pot and ring assembled, but without the grate or other parts of the furnace. Fig. 2 is a perspective view of a single plate partially removed and projected in respect to a section of the pot and the ears thereon. Fig. 3 is a reduced plan view of the water-coil section.

My improved fire-pot is adapted to be used with various styles of furnaces and stoves, and although a casing and grate are not shown it will be understood that the pot is so equipped, as usual.

In detail pot A comprises a main shell or wall 2, cylindrical in form and tapering slightly in thickness from top to bottom and with its largest cross-section at its upper end.

A stepped formation of the upper edge of main wall 2 provides two shoulders 3 and 4 at different elevations, upon which inner-wall sections B and water-section C are respectively supported. Thus inner-wall sections B have each an upper outwardly-extending flange 5, adapted to rest upon shoulder 3, and water-section C has a base rib or extension 6 resting upon shoulder 4 and encircled upon its outside by a confining-rib 7 upon pot A. The inner face 8 of water-section C is rounded, and its bottom is raised by base-rib 6 above flange 5 of wall-section B to give a space or clearance above shoulder 3 for the uplifting of said wall-sections when for any reason any one of them requires removal. Each section B is inclined inward in respect to wall 2 to form a fire-pot of less diameter at its bottom than at its top and is gradually spaced apart from wall 2 from top to bottom to give the greatest space between said parts at the bottom, where air is admitted and falling ashes drop through. Each section B is in the form of a curved plate, wider between its sides at its top than at its bottom, and when all the plates are in place within pot A they are firmly locked together, because of their abutting edge relationship. Said sections or plates are further interlocked and held in fixed position in respect to each other and to wall 2 by rearwardly and downwardly extending lugs 9, integral with the bottom corner of each section, and which are adapted to seat within ears or loops 10 on the bottom inner side of wall 2. Each ear or loop 10 seats two lugs 9, one on each adjoining section B.

The circular air-chamber 12, formed between walls 2 and section-plates B, provides for a free circulation of air about the entire pot from top to bottom and protects the parts from overheating and burning out. Numerous openings 13 at different elevations in each plate B admit the air to the interior of the pot, and the uniform distribution of air thus provided prevents the pot from cracking and gives a uniform firing of the fuel and an even mixture of the air with the gases. The heating of the air within chamber 12 also contributes to promote complete combustion. Openings 13 are funnel-shaped, with their largest end open to chamber 12 to promote an upwardly-inclined flow of air and to give free clearance for ashes and cinders which may work through from the interior of the pot.

Water-section C is hollow and has a partition-wall 15 at one point in its circumference and at one side of which I connect an intake-pipe 16 and at the other side a discharge-pipe 17, thus requiring the water to flow around the entire circle before discharging. Said inlet and outlet pipes may be located at any side or radial point of the stove or furnace, as C is rotatably mounted upon pot A. This is of advantage in making pipe connections.

Flange 5 stiffens sections B at their top and prevents warping thereof.

What I claim is—

1. A fire-pot for furnaces comprising an outer wall having a rabbeted top ledge inside, in combination an inner wall constructed of sections having vertical edges resting one against the other and provided with rearward flanges at their top engaged upon said ledge, and said sections interlocked at their lower ends with the rear wall and apart therefrom.

2. A fire-pot for furnaces comprising an outer wall and a sectional inner wall, said outer wall constructed at its top to rest the inner wall thereon and provided with inwardly-extending projections at its bottom, and the inner wall provided with lugs at its bottom seated in said projections.

3. A fire-pot for furnaces and stoves comprising a circular outer wall, and an inner wall formed of separately-removable sections, said sections widest at their top and arranged edge to edge, and each section having separate engagement at both ends with said outer wall and perforated between its ends.

4. A fire-pot for furnaces and stoves comprising an outer wall having a shoulder about its top and projections at its bottom, and a series of separately-removable perforated inner-wall sections having each a flange at its top adapted to rest on said shoulders and bottom lugs on the rear thereof adapted to interlock with said projections.

5. A fire-pot for furnaces and stoves consisting of an outer wall, and an inner wall comprising a series of sections having rearward projections at their top adapted to rest upon said outer wall, and the outer wall provided with projections inside at its bottom, and said inner sections having lugs adapted to seat from above in said projections, said projections being located on the lines between said sections.

6. A circular fire-pot for furnaces and stoves comprising an outer wall having a top ledge and an inner wall constructed of separate sections having flanges adapted to rest upon said ledge, in combination with a water-section adapted to rest upon said outer wall and overlap said flanges and spaced apart therefrom to permit removal of said inner-wall sections.

7. A fire-pot for furnaces and stoves consisting of an outer wall, and an inner wall of removable sections spaced apart therefrom and supported at both top and bottom from said outer wall, in combination with a water-section adapted to rest on said outer wall and spaced apart therefrom upon its inner side and bottom to permit removal of the inner sections.

In testimony whereof I sign this specification in the presence of two witnesses.

JOHN P. KOLLA.

Witnesses:
R. B. MOSER,
G. H. LANDWEHR.